Aug. 14, 1923.
D. C. PRINCE
1,465,091
GOVERNOR FOR ELASTIC FLUID ENGINES
Filed Feb. 19, 1921
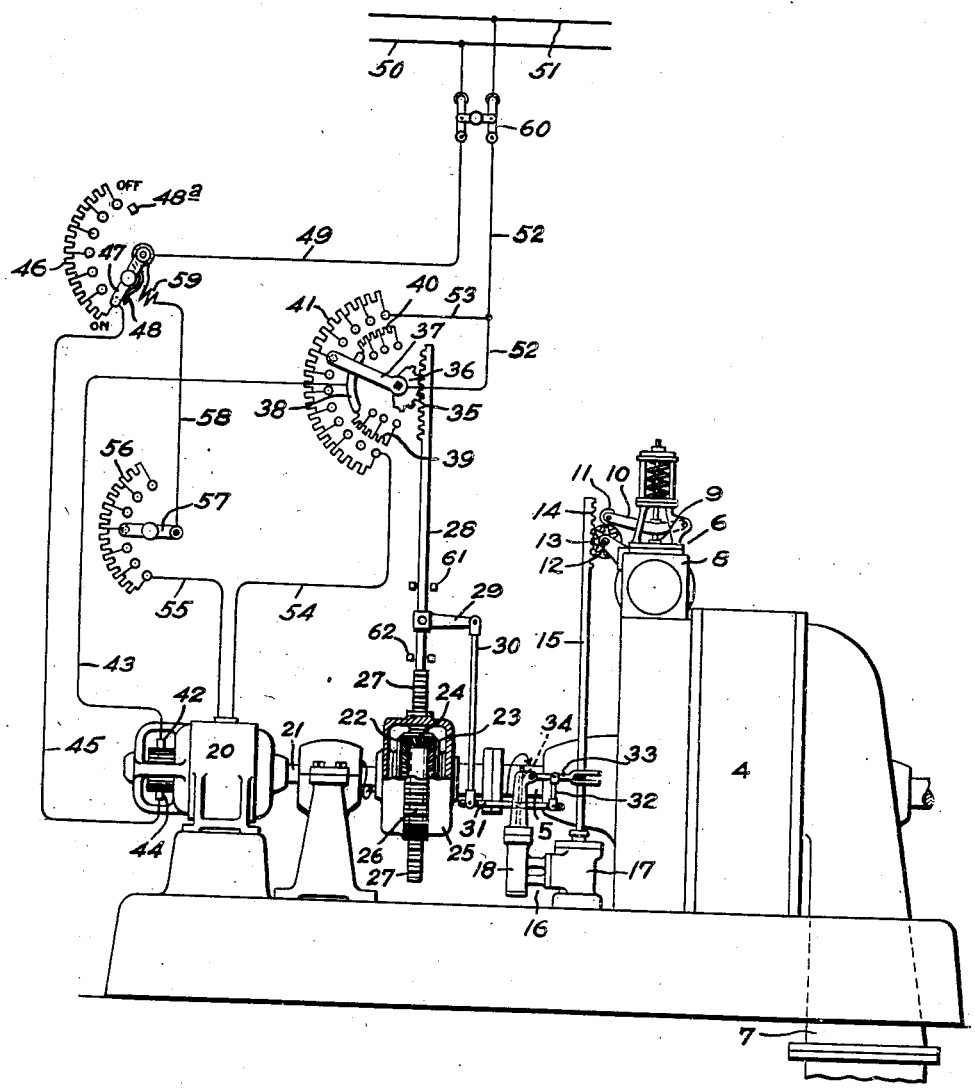
Inventor:
David C. Prince,
by Albert G. Davis
His Attorney.

Patented Aug. 14, 1923.

1,465,091

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

GOVERNOR FOR ELASTIC-FLUID ENGINES.

Application filed February 19, 1921. Serial No. 446,511.

*To all whom it may concern:*

Be it known that I, DAVID C. PRINCE, a citizen of the United States, residing at Schenectady, county of Schenectady, State of New York, have invented certain new and useful Improvements in Governors for Elastic-Fluid Engines, of which the following is a specification.

The present invention relates to governors for elastic fluid engines such as steam turbines and the like, and particularly to governors of the type comprising a differential wherein one element is driven by the engine and the other by a motor of constant speed, any variation in speed of the engine from the constant speed fixed by the motor effecting an adjustment of the valve means controlling the admission of elastic fluid to the engine. This type of governing mechanism has inherent advantages in the way of reliability in operation, sensitiveness, power, and simplicity of structure. In actual practice, however, it is subject to "hunting" and the object of my present invention is to provide an improved structure and arrangement whereby such "hunting" will be avoided.

For a consideration of what I believe to be novel and my invention, attention is directed to the accompanying description and the claims appended thereto.

In the drawing, the figure is a diagrammatic view of a governing mechanism embodying my invention, the same being shown, by way of example, in connection with a steam turbine.

Referring to the drawing, 4 indicates a steam turbine having a shaft 5, a valve means 6 for controlling the admission of elastic fluid, and an exhaust conduit 7 which may lead to a suitable condenser. Valve means 6 may be of any suitable type, that illustrated being a known type comprising a valve chest 8 in which are a number of valves 9 arranged in a row and adapted to be successively lifted by lever arms 10 having rollers 11 at their free ends which are engaged by cams carried by a cam shaft 12. On cam shaft 12 is a pinion 13 with which meshes a rack 14 formed on the upper end of a rod 15 fixed to the piston of a servo-motor 16. The cylinder of the servo-motor is indicated at 17 and its pilot valve at 18. The valve structure and servo-motor arrangement shown is to be taken as typical of any known or suitable mechanism for directly controlling the admission of elastic fluid to a turbine.

Mounted adjacent turbine 4 is a constant speed motor 20 having its shaft 21 in axial alignment with turbine shaft 5. Motor 20 is preferably in the form of a shunt wound direct current electric motor, although it will be understood that in its broader aspects my invention is not necessarily limited to a motor of such type. Connected to shafts 21 and 5 are two bevel gears 22 and 23 of a differential gearing. Bevel gears 22 and 23 mesh with one or more gear wheels 24 carried by casing 25. On casing 25 is an external gear 26 which may be in the form of teeth cut directly on its surface and meshing with gear 26 is a rack 27 on the lower end of a rod 28. Fixed on rod 28 is an arm 29 connected by a link 30 to one end of a floating lever 31. The other end of floating lever 31 is connected by a link 32 and lever 33 to piston rod 15. At its central portion lever 31 is connected to stem 34 of pilot valve 18.

On the upper end of rod 28 is a rack 35 which meshes with a pivotally mounted toothed segment 36 carrying a contact arm 37. Contact arm 37 moves over a contact 38, at the ends of which are resistance units 39 and 40, and also over the contacts of a resistance 41. One brush 42 of motor 20 is connected by a conductor 43 to contact 38 and the other brush 44 is connected by a conductor 45 to a starting resistance 46. At 47 is a starting lever which coöperates with resistance 46 and is biased to "off" position by a spring 48. 48ª indicates a stop for starting lever 47. Starting lever 47 is connected by a conductor 49 to one side 50 of a suitable source of power. The other side 51 of the source of power is connected by conductor 52 to contact arm 37, and by a branch conductor 53 to resistance 41. One terminal of the field of motor 20 is connected by a conductor 54 to resistance 41, and the other terminal is connected by a conductor 55, regulating resistance 56, contact arm 57, conductors 58, and conductor 49 to side 50 of the source of power. In conductor 58 is a no field release magnet 59 for contact arm 47, and in conductors 49 and 52 is a suitable switch 60. At 61 and 62 are stops for limiting the movement of the differential in each direction, the same cooperating with the hub of arm 29.

The operation is as follows: Assume that the turbine is running and that the motor 20 is also running, switch 60 being closed, starting resistance 46 being cut out, and contact arm 57 being set to cause motor 20 to run at a certain speed which is the desired turbine speed. Assume also that the directions of rotation of shafts 21 and 5 are those indicated by the arrows. Contact arm 37 is positioned so a certain amount of resistance 41 is in the field circuit of motor 20, thereby providing a certain field strength. As long as the motor speed and the turbine speed are the same, differential gear wheels 22 and 23 will be rotated at the same rate of speed and in opposite directions and there will be no turning movement of casing 25 relatively to gear wheels 22 and 23, gear wheels 24 turning on their pivotal connections with casing 25. If now the turbine decreases in speed due to additional load or other cause, differential gear wheel 23 will run slower than gear wheel 22 with the result that casing 25 will turn relatively to gear wheels 22 and 23 in a direction to raise rod 28. The raising of rod 28 will lift pilot valve 18 thereby admitting actuating fluid to cylinder 17 above the piston therein which will lower the rod 15 and effect a further opening of the valve mechanism to admit more elastic fluid to the turbine to enable it to come back to speed. In this connection it will be understood that the servo-motor 16 is of usual and well known structure and operates in the usual manner to move the valve mechanism, the connection embodying a known arrangement of follow-up device to prevent overtravel. The arrangement illustrated may be taken as typical of any suitable arrangement whereby movement of rod 28 effects a movement of the valve mechanism. In case the speed of the turbine increases above that set by motor 20, due for example to a decrease in load, then the same action takes place except in the opposite direction to close somewhat the turbine valve mechanism and bring the speed back to normal.

When rod 28 moves in response to a change in speed, rack 35 at the upper end of the rod moves contact arm 37 to increase or decrease the amount of resistance 41 in the field circuit of the motor. The purpose of this is to give a certain speed range to the governor from no load to full load to stabilize the governing action and prevent hunting. When rod 28 moves upward due to an increase in load, contact arm 37 is moved to cut a certain amount of resistance 41 out of the motor field circuit. This strengthens the motor field and thereby decreases the motor speed. The turbine, therefore, after being slowed down by an increase in load does not come back to its original speed but to a speed slightly lower. Likewise in case of an increase in speed due to a falling off in load, the downward movement of rod 28 will cut additional resistance 41 into the field circuit of the motor, thereby weakening the field and increasing the motor speed, so that the turbine does not come back to its original speed but to a speed slightly higher. By the provision of resistance 41 which is thus automatically cut into and out of the field circuit of the motor as the load varies, I provide a certain definite speed range between no load and full load whereby the governing is stabilized and hunting prevented. Branch conductor 53 serves to prevent an open circuit in case arm 37 moves beyond the last contact point of resistance 41.

At the extreme ends of its movements, the differential is prevented from further movement by stops 61 and 62 and when either of these positions is reached resistance 40 or 39 is cut into the armature circuit of the motor. The purpose of this is to break down the torque of the motor and thus protect the gear mechanism from excessive strains, and the motor windings from excessive currents.

By means of contact arm 57 the amount of resistance 56 in circuit with the motor field may be manually varied so as to set the motor for the desired turbine speed. When all of resistance 56 is cut out of the motor field circuit, the speed will be lowest and this may represent for example onefourth speed, while when all of resistance 56 is in circuit the speed will be highest, i. e., full speed. No matter for what speed the motor is set by contact arm 57, its range from no load to full load at any speed will be taken care of by resistance 41 so the governing will be stable and hunting avoided. The amount of resistance cut into and out of the field circuit by contact arm 37 is chosen to give the desired regulation in speed from no load to full load. This regulation may be made as close as found desirable and feasible in any particular case.

Electromagnet 59 in the motor field circuit serves to hold starting lever 47 in "on" position against the action of spring 48. In case the motor loses its field for any reason, then magnet 59 will be deenergized and spring 48 will move contact lever 47 to "off" position and open the motor circuit.

In starting up, motor 20 may be first started with contact arm 57 at quarter speed position, i. e., with resistance 56 all out of circuit. The turbine control hand valve with which the turbine is always supplied may be then gradually opened until the turbine comes to quarter speed and the differential governor takes control. The hand valve may be then fully opened and control arm 57 moved to set motor 20 for the turbine speed desired.

Turbine 4 may drive any suitable load such as a generator or the like or the propeller of a ship. The governing arrangement is particularly well adapted for the latter use since it will give stable governing over a wide range of load, and can be readily arranged for control of the turbine from any desired point.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In combination, a prime mover, a rotating shaft driven thereby, a second rotating shaft, means for driving it at a constant speed, a means responsive to difference in speed between said two shafts for regulating the prime mover, and means for varying automatically the speed of the second rotating shaft with changes in load on the prime mover to stabilize the regulation of the prime mover.

2. A governing mechanism for a prime mover having a shaft, said governing mechanism comprising a shaft, means for driving it at a constant speed, a differential mechanism arranged between said shaft and the prime mover shaft, and means connecting the differential mechanism to the valve gear of the prime mover, characterized by the fact that means are provided whereby the speed of the constant speed shaft is varied automatically from no load to full load to stabilize the governing.

3. A governing mechanism for a prime mover having a shaft, said governing mechanism comprising a shaft, means for driving it at a constant speed, a differential mechanism arranged between said shaft and the prime mover shaft, and means connecting the differential mechanism to the valve gear of the prime mover, characterized by the fact that means are provided whereby the speed of the constant speed shaft is varied automatically from no load to full load to stabilize the governing, and that means are provided for setting the driving means for the constant speed shaft to drive such shaft at a predetermined speed.

4. In combination, a prime mover, a valve mechanism for controlling the admission of motive fluid thereto, a shaft driven by the prime mover, a constant speed electric motor having a shaft, differential mechanism arranged between the motor shaft and prime mover shaft, means connecting the differential mechanism to said valve mechanism, and automatic means for varying the speed of the constant speed motor with changes in load on the prime mover so as to stabilize the governing.

5. In combination, a prime mover, a valve mechanism for controlling the admission of motive fluid thereto, a shaft driven by the prime mover, a constant speed electric motor having a shaft, differential mechanism arranged between the motor shaft and prime mover shaft, means connecting the differential mechanism to said valve mechanism, automatic means for varying the speed of the constant speed motor with changes in load on the prime mover so as to stabilize the governing, and means for setting the motor for a desired constant speed.

6. In combination, a prime mover, a valve mechanism for controlling the admission of motive fluid thereto, a shaft driven by the prime mover, a constant speed electric motor having a shaft, differential mechanism arranged between the motor shaft and prime mover shaft, means connecting the differential mechanism to said valve mechanism, an electrical resistance in the motor circuit, and means which is automatically operated to vary said resistance so as to increase and decrease the motor speed with decrease and increase in load on the prime mover.

In witness whereof, I have hereunto set my hand this 18th day of February, 1921.

DAVID C. PRINCE.